(12) United States Patent
Devine

(10) Patent No.: US 9,268,549 B2
(45) Date of Patent: Feb. 23, 2016

(54) METHODS AND APPARATUS TO CONVERT A MACHINE TO A VIRTUAL MACHINE

(71) Applicant: VMware, Inc., Palo Alto, CA (US)

(72) Inventor: C. Patrick Devine, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 84 days.

(21) Appl. No.: 14/068,925

(22) Filed: Oct. 31, 2013

(65) Prior Publication Data

US 2014/0298317 A1    Oct. 2, 2014

Related U.S. Application Data

(60) Provisional application No. 61/805,862, filed on Mar. 27, 2013.

(51) Int. Cl.
| | |
|---|---|
| *G06F 9/44* | (2006.01) |
| *G06F 9/445* | (2006.01) |
| *G06F 9/455* | (2006.01) |
| *G06F 9/50* | (2006.01) |

(52) U.S. Cl.
CPC *G06F 8/61* (2013.01); *G06F 9/455* (2013.01); *G06F 9/45558* (2013.01); *G06F 9/50* (2013.01); *G06F 9/4401* (2013.01); *G06F 2009/45562* (2013.01)

(58) Field of Classification Search
CPC .................................. G06F 9/455; G06F 8/61
USPC .......................................................... 717/174
See application file for complete search history.

(56) References Cited

U.S. PATENT DOCUMENTS

| | | | |
|---|---|---|---|
| 6,961,941 B1 | 11/2005 | Nelson et al. | |
| 7,814,495 B1 | 10/2010 | Lim et al. | |
| 2009/0328030 A1* | 12/2009 | Fries | 717/174 |
| 2010/0262962 A1* | 10/2010 | Chaganti | 717/174 |
| 2012/0180035 A1* | 7/2012 | Poddar et al. | 717/168 |
| 2013/0061224 A1* | 3/2013 | Reumann et al. | 718/1 |
| 2013/0283263 A1* | 10/2013 | Elemary | 718/1 |

* cited by examiner

*Primary Examiner* — John Chavis

(57) ABSTRACT

Methods, apparatus, systems and articles of manufacture are disclosed to convert a machine to a virtual machine. An example method disclosed herein includes moving, via a processor, an original operating system to create free space on a storage device, installing a hypervisor in the free space on the storage device, generating a virtual machine in the free space on the storage device, and loading the hypervisor and the virtual machine, the virtual machine to execute the original operating system.

38 Claims, 9 Drawing Sheets

METHODS AND APPARATUS TO CONVERT A MACHINE TO A VIRTUAL MACHINE

RELATED APPLICATION

This patent arises from a non-provisional application which claims the benefit of U.S. Provisional Application Ser. No. 61/805,862, filed on Mar. 27, 2013, entitled "Methods and Apparatus To Convert a Machine To a Virtual Machine," which is hereby incorporated herein by reference in its entirety.

FIELD OF THE DISCLOSURE

This disclosure relates generally to virtual computing, and, more particularly, to methods and apparatus to convert a machine to a virtual machine.

BACKGROUND

Virtualizing computing systems provides benefits such as the ability to execute multiple computing systems on a single hardware computing system, replicating computing systems, moving computing systems among multiple hardware computing systems, and so forth. Typically, virtualization systems include a hypervisor that creates and runs virtual machines. Some virtualization systems utilize a hypervisor that executes in (e.g., is hosted by) an operating system (e.g., Microsoft® Windows® operating system). Other virtualization systems utilize a hypervisor that executes directly on the hardware (sometimes referred to herein as a "native hypervisor" or a "bare-metal hypervisor"). Users (e.g., system administrators, information technology (IT) administrators, system operators, etc.) may elect to utilize a hosted hypervisor when available hardware resources (e.g., a computing system that does not have important data on it) cannot be dedicated to a new native hypervisor because a hosted hypervisor can be installed without overwriting the existing operating system and/or data.

DETAILED DESCRIPTION

Methods and apparatus disclosed herein facilitate the installation of a native hypervisor on a computing system with existing data (e.g., an existing operating system such as Microsoft Windows, Linux, another hypervisor, etc.) while substantially maintaining the existing data. In some examples, the existing data is transferred to a virtual machine that is run by the native hypervisor. For example, a computing system initially executing Microsoft Windows may be converted by the methods and apparatus disclosed herein to include a native hypervisor executing a virtual machine executing the same installation of Microsoft Windows. Installing a hypervisor as disclosed herein enables a computing system operator to quickly and easily deploy a virtual computing system. For example, a system administrator may convert a computing system to a virtual computing system in order to try the virtual computing system. After the conversion, additional virtual machines may be subsequently installed and the advantages of a virtual computing system may be realized by the system administrator.

In some examples disclosed herein, a booting partition on a storage device of a computing system is adjusted to make room for the installation of a hypervisor. The computing system is controlled to boot into an installer for the hypervisor. The hypervisor is installed on the active storage device and set to boot. A virtual machine that is executed by the hypervisor is created for the operating system originally executing natively from the partition. Thus, in some examples, the hypervisor is installed without destroying the original data on the storage device (and without the need for the system administrator to manually backup data to a second storage device) and the computing system can be quickly and easily converted to run virtual machines (including a virtual machine for the operating system executing on the computing system prior to installing the hypervisor). Accordingly, example methods and apparatus disclosed herein may increase the likelihood that a user (e.g., a system administrator) will adopt a native hypervisor by, for example, providing an apparatus to install and test the hypervisor without destroying the original operating system. In addition, by preserving the original operating system, example methods and apparatus disclosed herein enable a user to revert to using the original operating system with a minimal amount of disruption to the user. That is, examples disclosed herein reduce (e.g., minimize) the risk of testing the hypervisor.

Figure 1:
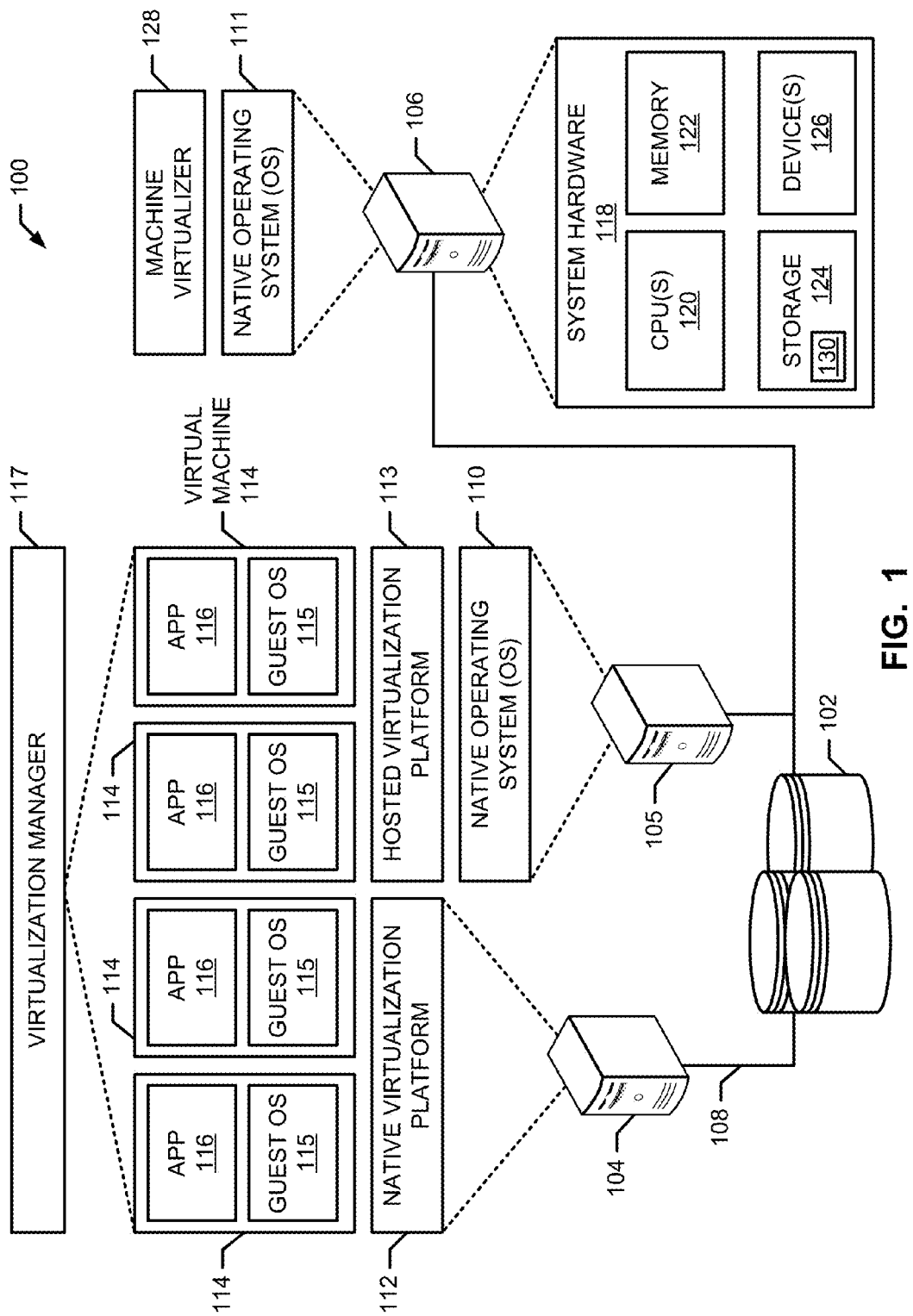
FIG. 1 is an illustration of an example computing environment including virtualization.

FIG. 1 is an illustration of an example computing environment 100. The example virtual computing environment 100 of FIG. 1 includes an example network of storage arrays 102 in communication with example computing servers 104, 105, 106. The example network of storage arrays 102 may be implemented using any suitable wired and/or wireless storage including, for example, one or more Fiber Channel Storage Area Network (SAN) arrays, one or more Internet Small Computer System Interface (iSCSI) SAN arrays, one or more Serial Attached Small Computer System Interface (SAS) arrays, one or more Serial Advanced Technology Attachment (SATA) arrays, etc. In the illustrated example, the network of storage arrays 102 are connected to and shared between groups of servers through storage area networks, thereby enabling aggregation of storage resources and enabling increased flexibility in provisioning the storage resources to, for example, example virtualization platforms 112, 113. In the illustrated example of FIG. 1, the example computing servers 104, 105, 106 may be x86 servers in communication with the example network of storage arrays 102 via an example network 108. The network 108 of FIG. 1 may be implemented using any suitable wired and/or wireless network(s) such as, for example, one or more data buses, one or more Local Area Networks (LANs), one or more wireless LANs, one or more cellular networks, the Internet, etc.

While the example computing environment 100 of FIG. 1 illustrates three computing servers 104, 105, 106, in other examples there may be other numbers of computing servers such as, for example, one, tens in a server rack, hundreds in a data center, or any other suitable number. In addition, a computing environment may include a combination of virtualized computing servers (e.g., computing servers that execute a virtualization platform) and non-virtualized computing servers. For example, the illustrated example of FIG. 1 includes virtualized computing servers 104, 105 and a non-virtualized computing server 106. In some examples, a computing environment may include a single computing server that is to be converted to virtualization.

In the illustrated example of FIG. 1, the example computing servers 104, 105 provide the example virtualization platforms 112, 113. Example virtualization platforms 112, 113 (sometimes referred to herein as a "virtualization layer," a "hypervisor," or a "virtual machine monitor") abstract processor, memory, storage and/or other resources of the computing servers 104, 105 into one or more virtual machines 114. In the illustrated example, a virtual machine 114 includes a guest operating system 115 and/or executes one or more applications 116. In some examples, the virtualization platforms 112, 113 may be installed on a storage device (e.g., a locally-attached storage device such as a SCSI storage device, an SAS storage device, a SATA storage device, etc., or a remote storage device such as a Fiber Channel storage device, an iSCSI storage device, etc.) rather than on a computing server. The example virtualization platforms 112, 113 virtualize and aggregate the underlying physical hardware resources (e.g., the example network of storage arrays 102 and/or the example computing servers 104, 105) across the physical computing environment and provide pools of virtual resources available for use in a virtual computing environment. Thus, by using the resources available from the physical components of the virtual computing environment, the example virtual machines 114 may request resources dynamically as a workload increases or release resources dynamically as the workload decreases.

The example virtualization platform 113 of FIG. 1 is installed on the computing server 105. The example computing server 105 executes an example native operating system 110 such as Microsoft Windows. In some such examples, the operating system 110 controls the virtualization platform 113 and the virtualization platform 113 executes as an application of the operating system 110. When the operating system 110 controls the virtualization platform 113, the virtualization platform may sometimes be referred to as a "hosted hypervisor." That is, the virtualization platform 113 executes as a layer on top of the operating system 110, and the operating system 110 controls the underlying physical hardware resources of the virtual computing environment.

In contrast to the example virtualization platform 113, the example virtualization platform 112 of FIG. 1 is installed natively on the computing server 104 and does not operate within another operating system. Thus, the virtualization platform 112 directly controls the underlying physical hardware resources of the virtual computing environment 100, and may sometimes be referred to as a "native virtualization platform," a "native hypervisor," etc.

In the illustrated example of FIG. 1, the virtual computing environment 100 includes an example virtualization manager 117 to manage the virtual computing environment of the computing servers 104, 105. For example, the virtualization manager 117 may provide a single point of control to the virtual computing environment 100. In some examples, the virtualization manager 117 manages the assignments of virtual machines 114 to be virtualized on corresponding ones of the computing servers 104, 105, and manages the assignments of resources of the computing servers 104, 105 to the virtual machines 114. In some examples, the virtual computing environment of the computing servers 104, 105 is accessible via a management client such as a web access interface that interfaces with the example virtualization manager 117.

The computing server 106 of the illustrated example includes physical system hardware 118 executing a native operating system 111. The computing server 106 (e.g., a "host machine") is to be converted to a virtualized server by the methods and apparatus disclosed herein. The example physical system hardware 118 of FIG. 1 (such as the example processing platform 900 discussed below in connection with FIG. 9) includes one or more processors (e.g., central processing units (CPUs)) 120, memor(ies) 122, storage device(s) 124, and/or other device(s) 126 (e.g., a network adaptor, an input device, an output device, optical storage, etc.). In the illustrated example, the storage device 124 includes an example bootloader 130 that is executed by the computing server 106 to boot the native operating system 111. The example bootloader 130 (e.g., a Windows® operating system bootloader (e.g., winload.exe, NT Loader, etc.)) is a program that loads an operating system (e.g., Microsoft Windows) or runtime environment (e.g., a virtualization platform) for the computing server 106 upon boot (e.g., start up from a powered down state). In some examples, the bootloader 130 is located in a boot sector or boot record of the storage device 124, and the bootloader 130 of FIG. 1 executes the instructions in the boot sector.

In the illustrated example of FIG. 1, an example machine virtualizer 128 facilitates installing a native hypervisor in the computing server 106 while substantially preserving (e.g., maintaining) existing data including the native operating system 111 stored in the underlying physical hardware resources of the computing server 106. To this end, the example machine virtualizer 128 adjusts a partition on the storage device 124 to a distance from the start of the storage device 124. For example, the machine virtualizer 128 may reduce the size of the space used by the partition and transfer data from the partition to another partition in the storage device 124. As used herein, the term partition refers to a logical group of storage such as block of memory, a block of storage, a block of bits, etc. In some examples, the machine virtualizer 128 reduces the size of the space used for the purpose of creating free space at the beginning and/or end of the storage device 124. The example machine virtualizer 128 may then install a hypervisor in the free space (e.g., at, for example, the beginning of the storage device 124). In some examples, the machine virtualizer 128 modifies a boot record in the storage device 124 to chain load a second bootloader to execute the hypervisor. As used herein, the term chain loading refers to using a first bootloader (sometimes referred to as a "boot manager") to load and execute a second bootloader. For example, chain loading may enable loading and executing a bootloader from a different sector (e.g., a different boot sector) on the storage device, from a second storage device, from an image file, etc. In some examples, chain loading the bootloader 130 may be used to replace the boot record of the storage device 124 to load, for example, a second operating system or a runtime environment. For example, the machine virtualizer 128 may modify (e.g., replace) the boot record of the storage device 124 to cause the example bootloader 130 to execute the second bootloader during boot. The example machine virtualizer 128 may then restart the computing server 106 to load and execute the hypervisor (e.g., a native hypervisor) during the next power-up. In some examples, a virtual machine is generated from, and uses, the preserved existing data to execute a virtualization of the native operating system 111 (sometimes referred to herein as the "original operating system"). In some examples, the machine virtualizer 128 uses the preserved data to revert the computing server 106 to execute the original operating system after the computing server 106 has been converted to execute the native virtualization platform 112.

Although the computing environment 100 of the illustrated example includes virtualized computing servers 104, 105 and a non-virtualized computing server 106, in other examples, a computing environment 100 may include a single computing server that is to be converted to a virtual computing server. For example, the example machine virtualizer 128 may be utilized with a computing server that is not in communication with other computing servers. Thus, for example, the computing environment 100 may not include the network of storage arrays 102, the computing servers 104, 105, the network 108, the virtualization manager 117, etc.

Figure 2:
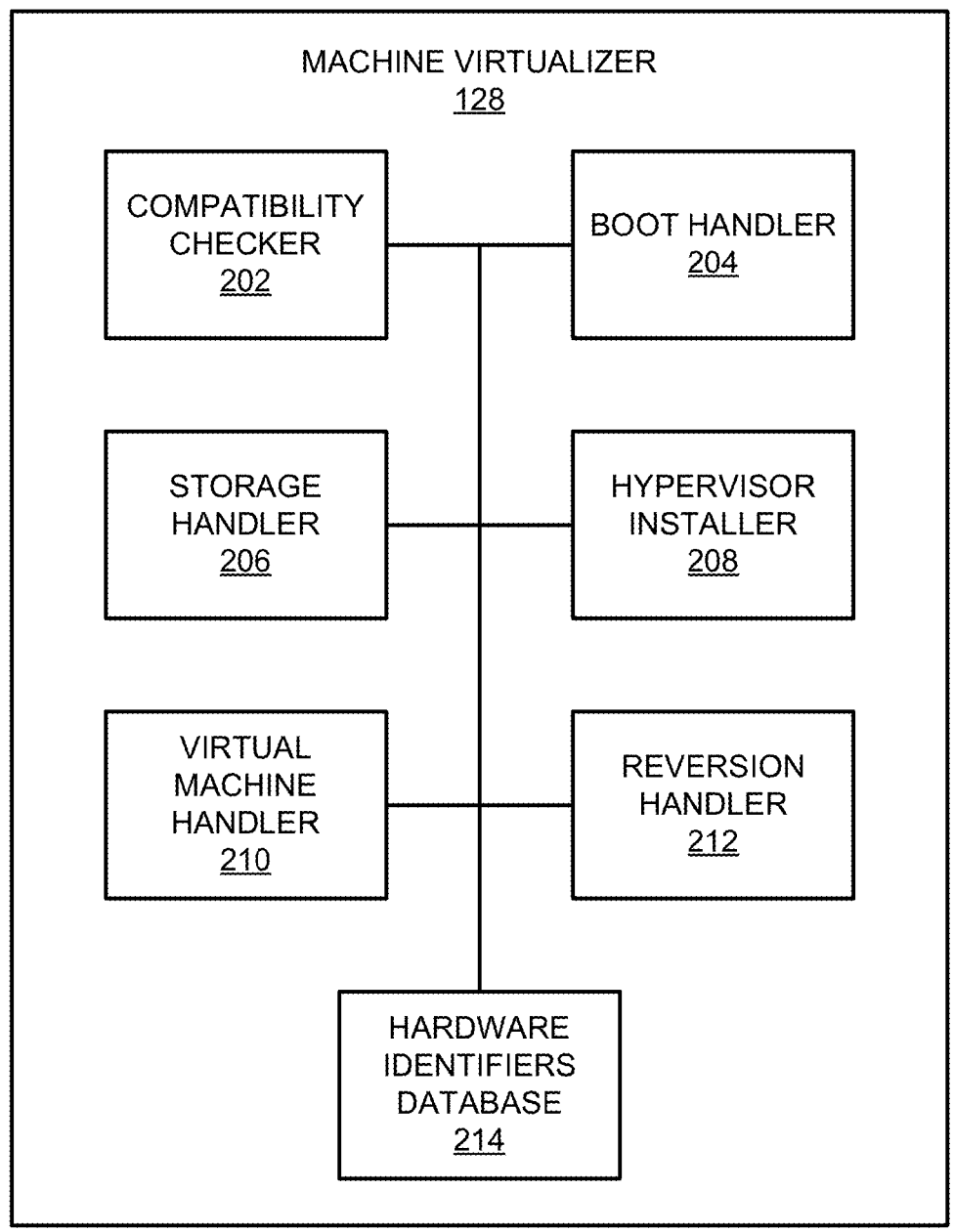
FIG. 2 is a block diagram of an example implementation of the example virtualization manager of FIG. 1.

FIG. 2 is a block diagram of an example implementation of the example machine virtualizer 128 of FIG. 1. In the illustrated example of FIG. 2, the machine virtualizer 128 installs a native virtualization platform to a host machine (e.g., a computing server) while preserving an original operating system executing on the host machine. The example machine virtualizer 128 includes an example compatibility checker 202, an example boot handler 204, an example storage handler 206, an example hypervisor installer 208, an example virtual machine handler 210, and an example reversion handler 212.

The example machine virtualizer 128 of FIG. 2 includes the example compatibility checker 202 to check the compatibility of a host machine (e.g., a host computing system on which a hypervisor is to be installed such as the example computing server 106 (FIG. 1)) for the installation of a native virtualization platform such as the example virtualization platform 112 (FIG. 1). For example, the compatibility checker 202 may determine if the host machine 106 includes sufficient hardware resources (e.g., memory, storage space, processing power, network connections, processor instruction set, etc.) for the installation of the virtualization platform 112.

The example compatibility checker 202 gathers hardware resource identifiers of the host machine 106 via one or more subsystems or components (e.g., extensions) of the original operating system 111 (FIG. 1) executing on the host machine 106. For example, the compatibility checker 202 may iterate through the hardware resources of the host machine 106 using, for example, Windows Management Instrumentation (WMI) to build an inventory of hardware identifiers (e.g., peripheral component interconnect (PCI) identifiers (PCI ID)) of the host machine 106.

In the illustrated example of FIG. 2, the example compatibility checker 202 compares the collected inventory of hardware identifiers of the host machine 106 to hardware identifiers of known compatible hardware resources. Known compatible hardware resources may be stored in an example hardware identifiers database 214 as a data structure such as a table (e.g., a lookup table), a list, a document, etc. In the illustrated example of FIG. 2, the example compatibility checker 202 determines the compatibility of the host machine 106 with the virtualization platform to be installed based on the comparison results. For example, the example hardware identifiers database 214 may specify a minimum bit processor (e.g., a 64-bit processor). That is, the example host machine 106 is compatible with the virtualization platform when the collected inventory of hardware identifiers of the host machine 106 includes a 64-bit or greater processor, but is not if the processor is less than a 64-bit processor. In some examples, the compatibility checker 202 of FIG. 2 facilitates determining whether the host machine 106 is compatible with the installation of a virtualization platform by collecting system information from a user (e.g., a system administrator). For example, the compatibility checker 202 may walk a user through a wizard interface to collect information for determining compatibility of the host machine 106.

In the illustrated example of FIG. 2, the example machine virtualizer 128 includes the example boot handler 204 to modify the boot record of a host machine to cause the host machine to boot the installer for the virtualization platform upon reboot. In the illustrated example, the boot handler 204 of FIG. 2 modifies the boot record of the host machine 106 to cause the host machine 106 to boot the installer for the virtualization platform from file(s) on a storage device storing the current operating system for the host machine 106. That is, the example boot handler 204 of the illustrated example modifies the bootloader of the current operating system (e.g., the Windows® operating system bootloader (e.g., winload.exe, NT Loader, etc.), the example bootloader 130 (FIG. 1)) to chain load a second bootloader (e.g., replace the Windows® operating system bootloader with a bootloader for the virtualization platform, cause the Windows® operating system bootloader to load a bootloader for the virtualization platform, etc.).

In the illustrated example, the boot handler 204 of FIG. 2 stores an image file (e.g., an ISO image) of the installer for the virtualization platform (e.g., the example hypervisor installer 208) in a partition of the example storage device 124 (FIG. 1). Alternatively, the example hypervisor installer 208 file(s) may be stored on any other storage device such as a removable storage disk (e.g., a compact disk) or a remote storage device (e.g., cloud computing resources). In the illustrated example, the example boot handler 204 modifies the native operating system bootloader 130 to boot a second bootloader (e.g., to chain load) that is capable of booting from an image file (e.g., grub4dos). For example, grub4dos enables reading an image file stored in the example storage device 124 and transferring the image file onto virtual devices. Thus, in the illustrated example, the example boot handler 204 of FIG. 2 causes the native operating system bootloader 130 to boot grub4dos, which then boots the image file for the example hypervisor installer 208.

In the illustrated example of FIG. 2, the example machine virtualizer 128 includes the example storage handler 206 to adjust the contents of the example storage device 124 to make room for the installation of a virtualization platform on the host machine 106. For example, a partition associated with the current operating system of the host machine 106 may span substantially the entire example storage device 124. In the illustrated example, the storage handler 206 of FIG. 2 performs one or more operations (e.g., defragment, compact, shrink partition, etc.) on the example storage device 124 to reduce the space used by the partition. For example, the storage handler 206 may move data from the operating system partition to another partition on the storage device 124.

Figure 3:
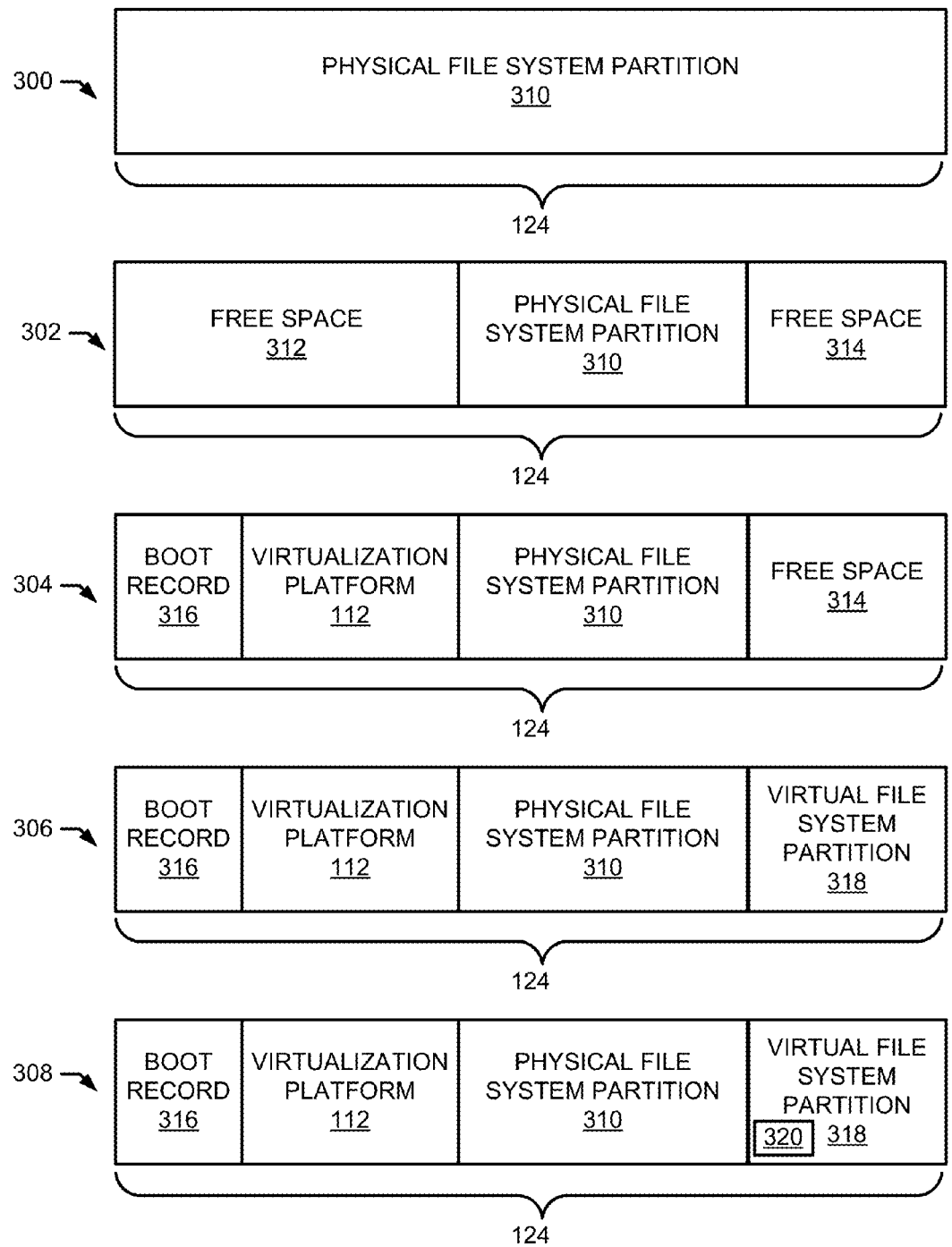
FIG. 3 illustrates example snapshots of the state of the example storage device of the example host machine of FIG. 1 at different stages during conversion of the example host machine to a virtual machine.

FIG. 3 illustrates example snapshots 300, 302, 304, 306, 308 of the state of a storage device (e.g., the example storage device 124 (FIG. 1)) of a host machine (e.g., the example computing server 106 (FIG. 1)) at different stages during conversion of the host machine 106 to a virtual machine. The example snapshot 300 represents the initial state of the storage device 124. For example, the storage device 124 illustrated in snapshot 300 includes a physical file system partition 310 such as a New Technology File System (NTFS), a file system developed by Microsoft Corporation(R) of Redmond, Wash. In the illustrated example, the physical file system partition 310 of FIG. 2 is an operating system partition including, for example, one or more operating systems and/or application(s) files, and/or application data.

The example snapshot 302 represents the state of the storage device 124 after the example storage handler 206 (FIG. 2) reduces the space used by the operating system partition 310. In some examples, the storage handler 206 creates free space at the beginning of the storage device 124 and/or the end of the storage device 124. As described above in connection with the storage handler 206 and as illustrated in the example snapshot 302, the example storage handler 206 creates example free space 312 at the beginning of the storage device 124 (e.g., between the start of the storage device 124 and the start of the operating system partition 310) and example free space 314 at the end of the storage device 124 (e.g., between the end of the operating system partition 310 and the end of the storage device 124).

In some examples, the storage handler 206 of FIG. 2 performs one or more operations (e.g., defragment, compact, shrink partition, etc.) on the operating system partition 310 to create free space 312, 314 on the storage device 124. For example, the storage handler 206 may reduce the space used by the example operating system partition 310 by performing a defragmentation operation or other operation to group the bits of data stored on the storage device 124 (e.g., bits that were previously spread across the storage space of the disk). The example storage handler 206 of FIG. 2 then changes the parameters of the example operating system partition 310 to span less storage space on the storage device 124. Alternatively, the storage handler 206 of FIG. 2 may reduce the space used by the operating system partition 310 while the original operating system 111 is executing. In some examples, the storage handler 206 of FIG. 2 reduces the space used by the operating system partition 310 after the original operating system 111 has been shut down (e.g., after the example boot handler 204 causes the example hypervisor installer 208 to boot).

In some examples, the storage handler 206 of FIG. 2 adjusts the example storage device 124 by moving a portion of the data from the operating system partition 310 to a virtual disk on the storage device 124. As disclosed in greater detail below in connection with the example hypervisor installer 208 and the example virtual machine handler 210, the example hypervisor installer 208 may create a virtual filing system at the end of the storage device 124 (e.g., in the example free space 314) and the example virtual machine handler 210 may create a virtual disk in the virtual filing system. In some such examples, the storage handler 206 of FIG. 2 cooperates with the example virtual machine handler 210 to move a portion (e.g., a block) of the data from the operating system partition 310 to the virtual disk created by the virtual machine handler 210. For example, the storage handler 206 may piece-meal move (e.g., copy) a portion of data from the front of the operating system partition 310 to the virtual disk to create space in the front of the example storage device 124 to install the virtualization platform 112. In some examples, the storage handler 206 of FIG. 2 moves data from the operating system partition 310 until enough free space is created between the start of the storage device 124 and the front of the example operating system partition 310 to install the virtualization platform. In some examples, the storage handler 206 of FIG. 2 continues to move data from the operating system partition 310 until all the data in the operating system partition 310 is moved to the virtual disk.

In the illustrated example of FIG. 2, the example machine virtualizer 128 includes the example hypervisor installer 208 to install a virtualization platform (e.g., a hypervisor, etc.) on a storage device of the host machine. In some examples, installing the virtualization platform includes installing a bootloader for the virtualization platform and the virtualization platform to a storage device (e.g., the example storage device 124 (FIG. 1)). For example, the virtualization platform may be copied to the example storage device 124 from another storage device, copied to the storage device 124 from an image file(s), etc. In some examples, the components of the virtualization platform may be copied to the example storage device 124 from the executing hypervisor installer 208. For example, the hypervisor installer 208 of FIG. 2 may be executing an instance of the virtualization platform to perform the install. For example, the virtualization platform may be executed as a layer on top of the native operating system.

In the illustrated example of FIG. 2, the example hypervisor installer 208 installs a boot record at the start of the storage device (e.g., the example storage device 124) of the hosted machine 106. For example, the hypervisor installer 208 may install the boot record on free space at the start of the storage device 124 created by the example storage handler 206. Additionally or alternatively, the example hypervisor installer 208 may install the boot record in any other location such as at the end of the storage device 124, at the start and end of the storage device 124, at the start of a partition (e.g., a physical file system partition, a virtual file system partition, etc.), etc. The boot record may be any type of boot record such as a master boot record (MBR), a primary boot record (PBR), a boot record in a globally unique identifier (GUID) partition table (GPT), etc. In the illustrated example of FIG. 2, the example hypervisor installer 208 installs a virtualization platform (e.g., the example virtualization platform 112) in free space between the boot record and the example operating system partition 310.

In the illustrated example of FIG. 3, the example snapshot 304 represents the state of the example storage device 124 (FIG. 1) after the example hypervisor installer 208 (FIG. 2) installs a virtualization platform (e.g., the example virtualization platform 112 (FIG. 1)) on the storage device 124. As described above in connection with the hypervisor installer 208 and as illustrated in the example snapshot 304, the hypervisor installer 208 installs an example boot record 316 (e.g., an MBR, a boot record in a GPT, etc.) at the start of the example free space 312. The example hypervisor installer 208 then installs the example virtualization platform 112 between the end of the boot record 316 and the start of the operating system partition 310. In some examples, the hypervisor installer 208 may install a boot record at any other location on the example storage device 124. For example, the hypervisor installer 208 may install the boot record 316 at the end of the storage device 124 (e.g., at the end of the example free space 314). In some examples, the hypervisor installer 208 installs a primary boot record (PBR) (e.g., the example boot record 316) and a secondary boot record (SBR) at, for example, the end of the storage device 124 (e.g., at the end of the example free space 314).

In some examples, the example hypervisor installer 208 creates one or more virtual file system partitions (sometimes referred to herein as "virtual file systems") on the storage device 124. For example, the hypervisor installer 208 may create a virtual file system partition in free space at the end of the storage device 124 (e.g., the example free space 314). A virtual file system is a file system shared by one or more virtual machines (e.g., the example virtual machines 114 (FIG. 1)) in a virtual computing environment (sometimes referred to as a "clustered file system"), and is optimized for use with virtual machines. In some examples, the virtual file system may include a virtual disk (sometimes referred to herein as a "virtual machine disk"), wherein one or more virtual disks may be devoted to a virtual machine. In some examples, the virtual file system is a hierarchical directory structure. Thus, in some examples, the virtual file system may store the one or more files that make up a virtual machine in a single directory. In some such examples, the virtual file system may create a new subdirectory for each new virtual machine, and delete an existing subdirectory when a corresponding virtual machine is destroyed.

In some examples, the hypervisor installer 208 of FIG. 2 creates a virtual file system that is a thin provisioned file system. A thin provisioned file system increases storage utilization of a storage device by reducing the amount of space in the storage device that is allocated but not used. For example, a thin provisioned virtual disk on a virtual file system may reserve a block of space for use, but the space is not dedicated to the virtual disk and/or used until the space is needed to store additional data. As a result, while the space is not dedicated to the virtual disk, a physical file system or another virtual disk may continue to access the data in the space. The example snapshot 306 (FIG. 3) represents the state of the example storage device 124 after the example hypervisor installer 208 creates a virtual file system. As illustrated in the example snapshot 306, the example hypervisor installer 208 creates an example virtual file system partition 318 on the example free space 314 created by the example storage handler 206.

In the illustrated example of FIG. 2, the example machine virtualizer 128 includes the example virtual machine handler 210 to create a virtual machine (e.g., the example virtual machines 114 (FIG. 1)). For example, the virtual machine handler 210 may generate a virtual machine configuration (e.g., a file, a document, a table, etc.) for the original operating system (e.g., the example original operating system 111 (FIG. 1)). In some examples, the virtual machine handler 210 generates the virtual machine configuration using information gathered about the host machine 106 by the example compatibility checker 202 (e.g., the resource identifiers extracted by the compatibility checker 202). The example virtual machine handler 210 of FIG. 2 stores the virtual machine configuration in the virtual file system created by the example hypervisor installer 208 (e.g., the example virtual file system partition 318).

In the illustrated example of FIG. 3, the example snapshot 308 represents the state of the example storage device 124 after the example virtual machine handler 210 generates an example virtual machine configuration 320. For example, the virtual machine handler 210 may generate the virtual machine configuration 320 using the resource identifiers extracted by the example compatibility checker 202. In the illustrated example of FIG. 3, the virtual machine handler 210 stores the virtual machine configuration 320 in the virtual file system partition 318.

In some examples, the virtual machine handler 210 of FIG. 2 installs virtual machine drivers to enable the virtualization platform to access (or access more efficiently or completely) the virtual machine resources of the virtual machine. Alternatively, the example virtual machine handler 210 of FIG. 2 may determine that no virtual drivers are needed based on information gathered by the example compatibility checker 202. For example, the appropriate drivers may already be included in the original operating system 111. In some examples, the example virtual machine handler 210 of FIG. 2 causes the installed virtualization platform to boot after the virtual drivers are installed and/or determined to be included in the native operating system. For example, the virtual machine handler 210 may reboot the host machine 106, and the chain loaded bootloader may boot the installed virtualization platform. The example virtual machine handler 210 may then cause the virtualization platform to start a virtual machine.

In some examples, the virtual machine handler 210 of FIG. 2 transfers the original (e.g., current, native, etc.) operating system of the host machine to the virtual machine. To this end, the example virtual machine handler 210 creates a virtual disk on the virtual file system to store data and/or files for the virtual machine. The example virtual machine handler 210 then moves existing data for the original operating system to the virtual disk, thereby preserving the original operating system. For example, the virtual machine handler 210 may cooperate with the example storage handler 206 to move a portion of data from the operating system partition (e.g., the example operating system partition 310) to the virtual disk. In this manner, the example virtual machine handler 210 preserves existing data from the host machine 106, including example native operating system 111, and enables the virtual machine to execute the operating system as a guest operating system (e.g., the example guest operating system 115 (FIG. 1)) from the virtual disk.

In some examples, the virtual machine handler 210 creates a second virtual file system partition (sometimes referred to herein as an "extent") overlayed on the operating system partition. For example, when the example hypervisor installer 208 creates a thin provisioned file system, the example virtual machine handler 210 may reserve the operating system partition space as a second virtual file system partition. In some such examples, as portions of the operating system partition are moved (e.g., copied) to the virtual disk, the example virtual machine handler 210 increases the size of the virtual disk by an amount corresponding to the size of the data moved to the virtual disk. Accordingly, the virtual disk grows as the operating system partition shrinks. Furthermore, although the virtual disk grows to reserve more space in the example storage device 124 (e.g., overlapping with the operating system partition), the example virtual machine handler 210 manages the space on the storage device 124 so that the data in the reserved space is not dedicated to the virtual disk until needed, thereby preventing accidental overwriting and/or losing existing data in the operating system partition.

In the illustrated example of FIG. 2, the example machine virtualizer 128 includes the example reversion handler 212 to revert the host machine from executing a native hypervisor to executing the original operating system. For example, the reversion handler 212 may enable a user (e.g., a system administrator) to uninstall the virtualization platform installed by the example hypervisor installer 208 from the host machine (e.g., the example host machine 106 (FIG. 1)) and resume using the original operating system (e.g., the example native operating system 111 (FIG. 1)).

In some examples, the example reversion handler 212 reverts the storage device (e.g., the example storage device 124 (FIG. 1)) to reverse operations performed on the storage device. For example, the reversion handler 212 may cause the example storage handler 206 to return the partition of the operating system (e.g., the example operating system partition 310) to spanning substantially the entire storage device 124. In some examples, prior to adjusting the storage device 124, the example reversion handler 212 stops a virtual machine and/or turn off a virtual file system to ensure that data is not written to the partition while the adjustments are performed. For example, the reversion handler 212 may cause the example virtual machine handler 210 to stop the virtual machine executed by the installed virtualization platform and/or cause the example hypervisor installer 208 to turn off the virtual file system created on the storage device 124 (e.g., the example virtual file system partition 310). The example reversion handler 212 may also cause the virtual machine handler 210 to uninstall virtual drivers from the operating system. In some examples, the reversion handler 212 modifies the boot record of the host machine 106 to point to the bootloader for the original operating system. For example, the reversion handler 212 may cause the example boot handler 204 to remove the bootloader for the installer of the virtualization platform (e.g., the example hypervisor installer 208) and modify the boot record to cause the original operating system bootloader (e.g., the example native operating system bootloader 130 (FIG. 1)) to boot at the next power-up. In other examples, the example reversion handler 212 may automatically cause the original operating system to re-boot. For example, the reversion handler 212 may reboot the example host machine 106 to cause the native operating system bootloader 130 to boot the native operating system 111.

Figure 4:
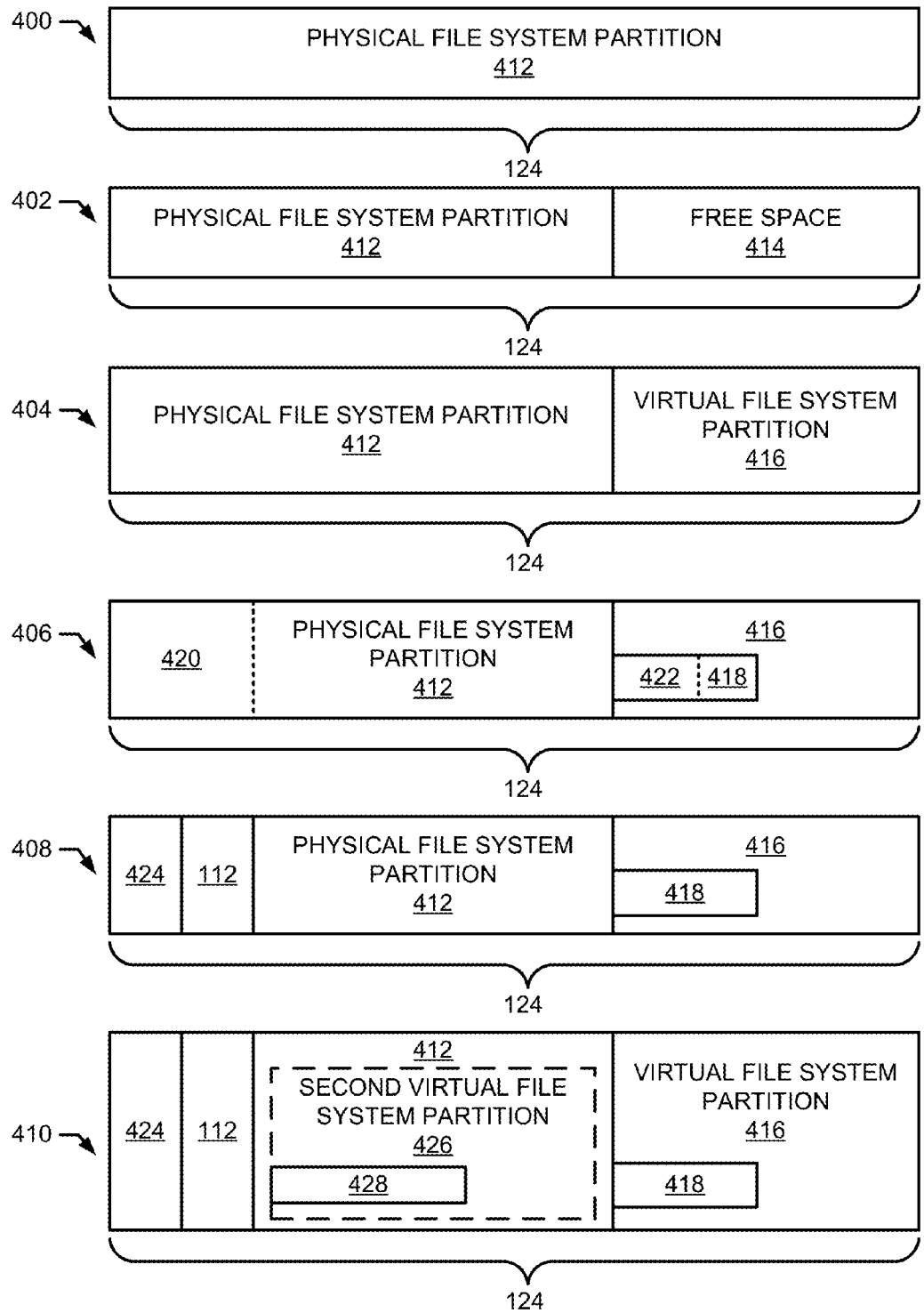
FIG. 4 illustrates example snapshots of the state of the example storage device of the example host machine of FIG. 1 at different stages during another conversion of the example host machine to a virtual machine.

FIG. 4 illustrates example snapshots 400, 402, 404, 406, 408, 410 representative of the state of a storage device (e.g., the example storage device 124 (FIG. 1)) of a host machine (e.g., the example computing server 106 (FIG. 1)) at different stages during another (e.g., a second) conversion of the host machine 106 to a virtual machine (e.g., the example virtual machines 114 (FIG. 1)), and will be described with reference to the example storage device 124 (FIG. 1) and the example machine virtualizer 128 (FIGS. 1 and/or 2). In the illustrated snapshots of FIG. 3, the storage handler 206 created free space 312, 314 at the beginning and end, respectively, of the storage device 124. In contrast, the example snapshots of FIG. 4 illustrate an example in which the storage handler 206 does not create free space at the beginning of the storage device 124. The example snapshot 400 represents the initial state of the storage device 124. For example, snapshot 400 illustrates the example storage device 124 including a physical file system partition 412. In the illustrated example, the physical file system 412 of FIG. 4 is an operating system partition including, for example, native operating system files and/or application data.

In the illustrated example of FIG. 4, the example snapshot 402 represents the state of the storage device 124 after the example storage handler 206 (FIG. 2) reduces the space used by the operating system partition 412. In some examples, the storage handler 206 creates free space at the beginning of the storage device 124 and/or the end of the storage device 124. As illustrated in the example snapshot 402, the storage handler 206 creates example free space 414 at the end of the storage device 124. That is, the example storage handler 206 performs one or more operations (e.g., defragment, compact, shrink partition, etc.) on the operating system partition 412 to reduce the space used by the partition in the storage device 124.

In the illustrated example of FIG. 4, the example snapshot 404 represents the state of the storage device 124 after the example hypervisor installer 208 (FIG. 2) creates a virtual file system. As illustrated in the example snapshot 406, the example hypervisor installer 208 creates an example virtual file system partition 416 on the example free space 414 created by the example storage handler 206.

In the illustrated example of FIG. 4, the storage device 124 does not have free space at the start of the storage device 124 to install a boot record and/or a virtualization platform. In some such examples, the example machine virtualizer 128 creates space at the start of the storage device 124 by moving data stored in the operating system partition 412. For example, the example virtual machine handler 210 (FIG. 2) creates an example virtual disk 418 on the example virtual file system 416. The example virtual machine handler 210 then cooperates with the example storage handler 206 to move (e.g., copy) bits (e.g., portions of data, blocks, etc.) from the start of the storage device 124 to the virtual disk 418. For example, the storage handler 206 may retrieve an example portion of data 420 from the start of the operating system partition 412. The example virtual machine handler 210 then stores the retrieved data in a block in the virtual disk 418 (e.g., an example block 422). In some examples, the amount of data that the storage handler 206 and the virtual machine handler 210 move from the example operating system partition 412 correlates to the amount of space on the storage device 124 that is needed to install a boot record and a virtualization platform.

In the illustrated example of FIG. 4, the example snapshot 408 represents the state of the example storage device 124 after the example hypervisor installer 208 (FIG. 2) installs example boot record 424 and example virtualization platform 112 on the storage device 124. For example, the hypervisor installer 208 may load the boot record 424 and the virtualization platform 112 after the storage handler 206 and the virtual machine handler 210 move the amount of data needed to load the boot record 424 and the virtualization platform 112 on the storage device 124 (e.g., the space freed by moving the portion of data 420 to the virtual disk 418).

In the illustrated example of FIG. 4, the example snapshot 410 represents the state of the example storage device 124 after the example virtual machine handler 210 completes transferring the original operating system of the host machine to the virtual disk 418. In the illustrated example snapshot 410, the example virtual machine handler 210 creates an example second virtual file system partition 426 (e.g., an extent) overlayed on the operating system partition 412. By creating the extent 426 over the operating system partition 412, the example virtual machine handler 210 reserves the space corresponding to the operating system partition 412, but the space is not dedicated to the example virtual disk 418 until needed. That is, when the extent 426 is overlaid on the operating system partition 412, the space overlaid by the extent 426 on the storage device 124 is blocked from being allocated to another object, but not dedicated to the extent 426. Thus, data stored in the operating system partition 412 overlaid by the extent is protected from being overwritten until needed, and then incrementally grows as needed. For example, when the virtual disk 418 is full of data, the virtual disk 418 extends into the example extent 426 and the virtual machine handler 210 may then continue to move data from the operating system partition 412 to an example virtual disk 428 that extends from the virtual disk 418. In this manner, the example virtual machine handler 210 reduces allocated (e.g., reserved) space that is not used on the storage device 124. Furthermore, as the example operating system partition 412 decreases in space, the example virtual disks 418, 428 increase in space. In some examples, the virtual machine handler 210 may not create an extent. For example, if the space of the operating system partition is less than half the total space of the storage device, then the virtual machine handler 210 is able to create a virtual disk in the virtual file system that is large enough to move (e.g., copy) the data from the operating system partition without having to extend into the operating system partition. In some such examples, the virtual machine handler 210 may copy the operating system partition 412 to create free space on the storage device 124 without deleting (e.g., removing, uninstalling, etc.) the operating system partition 412 from the storage device 124. Accordingly, the machine virtualizer 128 preserves the existing data (e.g., the example operating system partition 412) to facilitate a virtual machine executing the original operating system after the native virtualization platform 112 is installed on the host machine.

While an example manner of implementing the example machine virtualizer 128 of FIG. 1 is illustrated in FIG. 2, one or more of the elements, processes and/or devices illustrated in FIG. 2 may be combined, divided, re-arranged, omitted, eliminated and/or implemented in any other way. Further, the example compatibility checker 202, the example boot handler 204, the example storage handler 206, the example hypervisor installer 208, the example virtual machine handler 210, the example reversion handler 212, the example hardware identifiers database 214 and/or, more generally, the example machine virtualizer 128 of FIG. 1 may be implemented by hardware, software, firmware and/or any combination of hardware, software and/or firmware. Thus, for example, any of the example compatibility checker 202, the example boot handler 204, the example storage handler 206, the example hypervisor installer 208, the example virtual machine handler 210, the example reversion handler 212, the example hardware identifiers database 214 and/or, more generally, the example machine virtualizer 128 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example compatibility checker 202, the example boot handler 204, the example storage handler 206, the example hypervisor installer 208, the example virtual machine handler 210, the example reversion handler 212, and/or the example hardware identifiers database 214 is/are hereby expressly defined to include a tangible computer readable storage device or storage disk such as a memory, a digital versatile disk (DVD), a compact disk (CD), a Blu-ray disk, etc. storing the software and/or firmware. Further still, the example machine virtualizer 128 of FIG. 1 may include one or more elements, processes and/or devices in addition to, or instead of, those illustrated in FIG. 2, and/or may include more than one of any or all of the illustrated elements, processes and devices.

Flowcharts representative of example machine readable instructions for implementing the machine virtualizer 128 of FIGS. 1 and/or 2 are shown in FIGS. 5-8. In these examples, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5-8, many other methods of implementing the example machine virtualizer 128 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
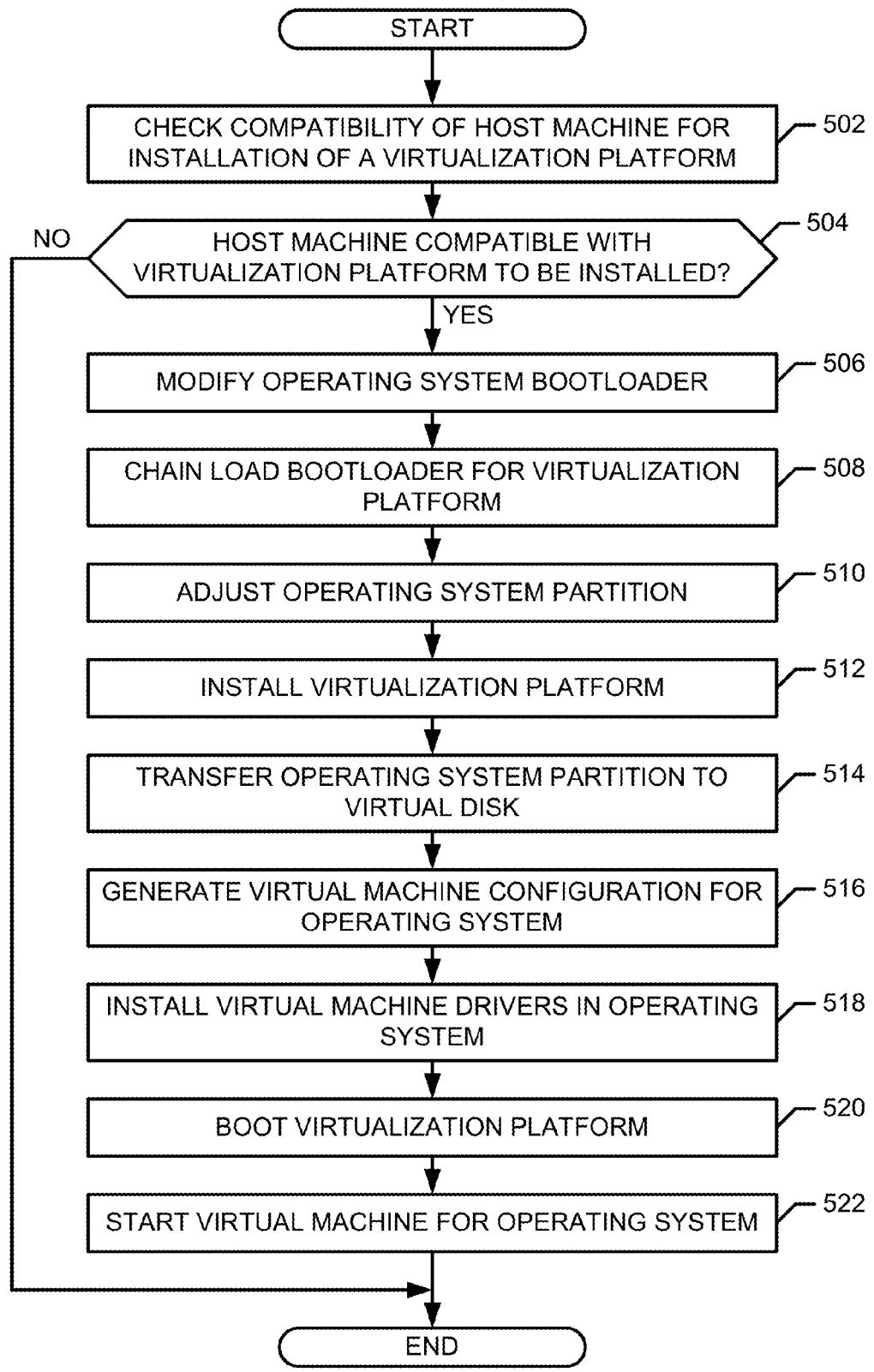
FIGS. 5-7 are flowcharts representative of example machine readable instructions that may be executed to facilitate conversion of the example host machine of FIG. 1 to a virtual machine including a native hypervisor executing on the host machine and running the virtual machine.

The example program of FIG. 5 begins at block 502 when the example compatibility checker 202 checks the compatibility of a host machine (e.g., the example computing server 106 (FIG. 1)) for the installation of a native virtualization platform (e.g., the example virtualization platform 112 (FIG. 1)). For example, the compatibility checker 202 may determine if the host machine includes sufficient hardware resources (e.g., memory, storage space including, for example, a locally-attached storage device (e.g., a SCSI storage device, an SAS storage device, a SATA storage device, etc.), processing power, network connections, processor instruction set, etc.) for the installation of the native virtualization platform 112. In some examples, the compatibility checker 202 determines if the hardware resources of the host machine 106 are compatible with the native virtualization platform 112 by extracting hardware identifiers (e.g., peripheral component interconnect (PCI) identifiers (PCI ID)) from an installer for the virtualization platform 112 (e.g., the example hypervisor installer 208 (FIG. 2) and comparing the hardware identifiers to hardware identifiers extracted from the host machine 106 (e.g., by iterating through the hardware components of the example host machine 106 using, for example, windows management instrumentation). For example, the compatibility checker 202 may compare the hardware resource identifiers extracted from the host machine 106 to known compatible hardware resource identifiers retrieved from the example hardware identifiers database 214.

In some examples, the compatibility checker 202 may also gather information from a user (e.g., a system administrator) for the computing system by, for example, presenting a user interface listing settings and/or questions to be answered by the system administrator. For example, the system administrator may configure the virtual machine to be installed (e.g., amount of memory allocated to the virtual machine, amount of storage allocated to the virtual machine, network resources allocated to the virtual machine, internet protocol address assigned to the virtual machine, etc.). In some implementations, block 502 and/or the compatibility checker 202 may not be included. For example, a user may manually perform a compatibility check by reviewing documentation for the native virtualization platform 112, the settings for the virtual machine may be selected as defaults or may be extracted from the current configuration of the host machine 106, etc.

If, at block 504, the example compatibility checker 202 determines that the host machine 106 is not compatible with the virtualization platform to be installed, the example process of FIG. 5 ends. That is, the machine virtualizer 128 (FIGS. 1 and/or 2) terminates the installation because the native hypervisor cannot be loaded on the example host machine 106. The host machine 106 continues executing the native operating system 111.

If, at block 504, the example compatibility checker 202 determines that the host machine 106 is compatible with the virtualization platform to be installed, then, at block 506, the example boot handler 204 modifies the bootloader of the native operating system (e.g., the example native operating system bootloader 130) to cause the host machine 106 to boot the installer for the virtualization platform (e.g., the example hypervisor installer 208) upon reboot. In some examples, the boot handler 204 modifies the boot record to cause the example host machine 106 to boot the installer for the virtualization platform from file(s) on the example storage device storing the current operating system for the host machine 106 (e.g., the example storage device 124 (FIG. 1)). Alternatively, the file(s) for the hypervisor installer 208 may be stored on any other storage device such as, for example, a removable storage disk. In some examples, the example boot handler 204 chain loads the bootloader of the current operating system (e.g., the Windows® operating system bootloader (e.g., winload.exe, NT Loader, etc.)) to chain load a second bootloader (e.g., grub4dos), which loads the hypervisor installer 208 from an image file (e.g., an ISO image). For example, the boot handler 204 may modify the boot record so that the second bootloader replaces the bootloader of the current operating system after the bootloader of the current operating system executes. In some examples, the boot handler 204 and block 506 may not be included (e.g., a user may insert a bootable removable disk storing the hypervisor installer).

At block 508, the example boot handler 204 then causes the example host machine 106 to reboot thereby chain loading the bootloader for the hypervisor installer 208. Accordingly, the hypervisor installer 208 is booted and has control of the host machine 106.

At block 510, the example storage handler 206 adjusts the operating system partition on the storage device, if needed, to make room for the installation of the virtualization platform. For example, a partition associated with the current operating system of the host machine 106 may span substantially the entire storage device. In some such examples, the storage handler 206 performs one or more operations (e.g., defragment, compact, shrink partition, etc.) on the storage device to reduce the space used by the partition. While the illustrated example describes adjusting the operating system partition, any additional or alternative partitions and/or disks may be adjusted (e.g., partitions not storing the operating system, storage disks other than a primary storage disk, locally-attached storage devices, remote storage devices, etc.). Adjusting the operating system partition is described in further detail in conjunction with FIGS. 6 and 7. In some examples, the storage handler 206 may not adjust the storage device 124 if there is already sufficient space available on the storage device.

At block 512, the example hypervisor installer 208 installs the virtualization platform in the space created on the storage device of the host machine 106. The virtualization platform may be copied to the storage device from another storage device (e.g., a locally-attached storage device such as a SCSI storage device, an SAS storage device, a SATA storage device, etc., or a remote storage device such as a Fiber channel storage device, an iSCSI storage device, etc.), copied to the storage device from an image, etc. Additionally or alternatively, the components of the virtualization platform may be copied to the storage device from the executing hypervisor installer 208.

At block 514, the example virtual machine handler 210 transfers the original operating system partition to a virtual disk for the virtual machine to be created. At block 516, the example virtual machine handler 210 generates a virtual machine configuration for the original operating system. For example, the virtual machine handler 210 may generate the example virtual machine configuration 320 (FIG. 3) using information gathered about the example host machine 106 and/or received from a user during the compatibility checking in block 502. At block 518, the example virtual machine handler 210 installs virtual machine drivers in the operating system. For example, the virtual machine drivers may enable the operating system to access (or access more efficiently or completely) the virtual hardware resources of the virtual machine. Alternatively, if no drivers are needed (e.g., during the compatibility check it was determined that the operating system already includes appropriate drivers), control proceeds to block 520.

At block 520, the example virtual machine handler 210 causes the installed virtualization platform (e.g., the native virtualization platform 112 (FIG. 1)) to be booted (e.g., by rebooting the host machine 106). At block 522, the example virtual machine handler 210 causes the native virtualization platform 112 to start the virtual machine for the operating system (e.g., as a guest operating system 115 (FIG. 1)). As a result, the original operating system 111 of the host machine 106 now executes as a virtual machine 114 on the installed native virtualization platform 112, and the data originally stored on the storage device 124 of the host machine 160 is maintained. Additional virtual machines may also be added to the host machine.

Figure 6:
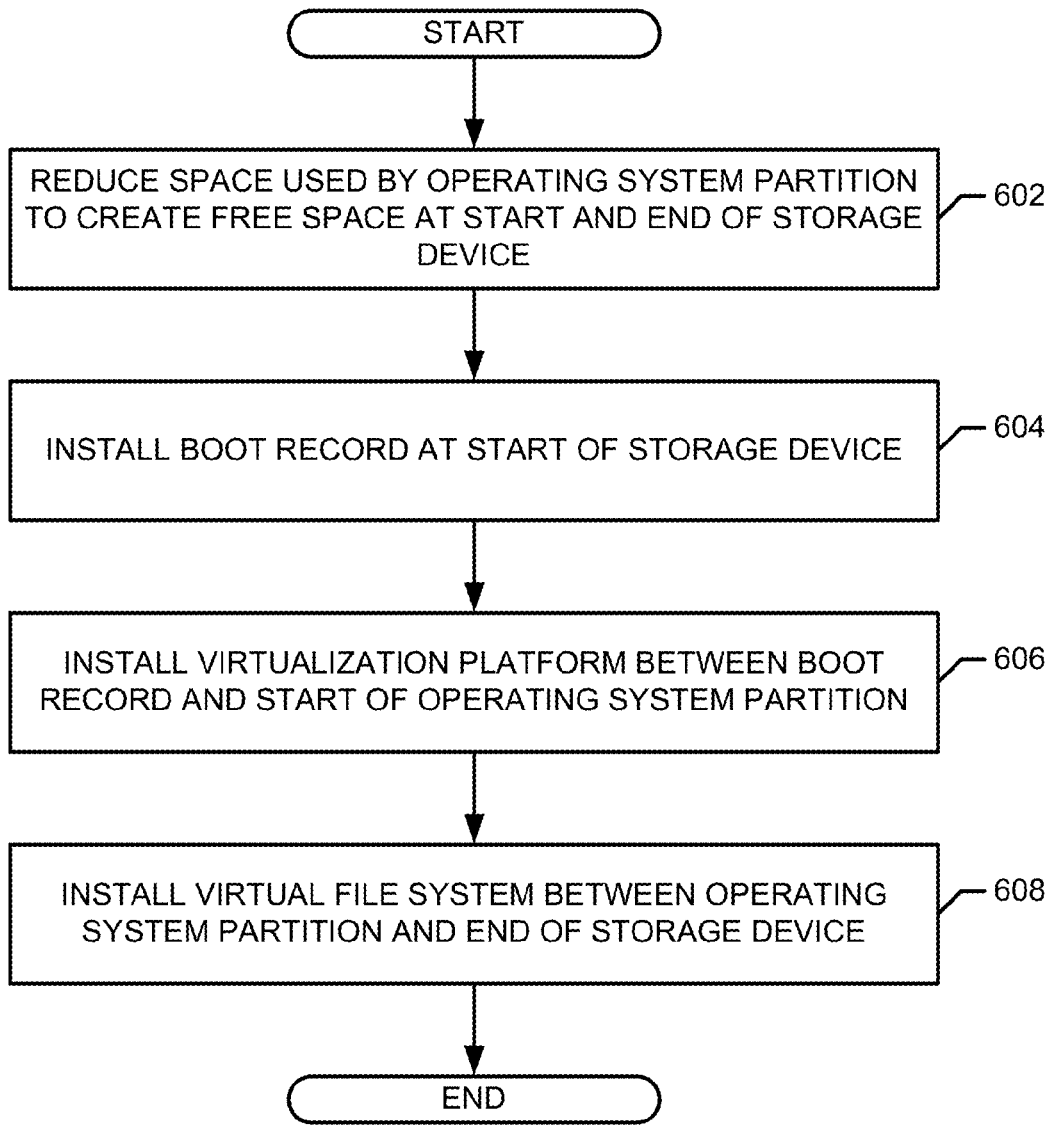

The example method of FIG. 6 adjusts an operating system partition and installs a virtualization platform. The example method of FIG. 6 may be used to implement blocks 510 and 512 of FIG. 5. The example method of FIG. 6 begins at block 602 when the example storage handler 206 (FIG. 2) reduces the space used by the operating system partition 310 (FIG. 3) of the host machine 106 (FIG. 1) to create free space at the start (e.g., example free space 312 (FIG. 3)) and end of the storage device 124 (FIGS. 1 and/or 3) (e.g., the example free space 314 (FIG. 3)). In some examples, the storage handler 206 reduces the space used by the operating system partition 310 while the native operating system 111 is executing. In other examples, the storage handler 206 reduces the space used by the operating system partition 310 after the operating system 111 has been shut down (e.g., after booting the example hypervisor installer 208 (FIG. 2)). The example storage handler 206 may reduce the space used by the operating system partition 310 by performing a defragmentation operation or other operation to group the bits of data stored on the storage device 124 and then changing the parameters of the partition to span less storage space on the storage device 124.

At block 604, the example hypervisor installer 208 installs a boot record (e.g., the example boot record 316 (FIG. 3)) at the start of the storage device 124 on free space 312. The boot record 316 may be any type of boot record such as a Master Boot Record (MBR), a boot record in a globally unique identifier (GUID) partition table (GPT), etc. At block 606, the example hypervisor installer 208 installs the virtualization platform (e.g., the example virtualization platform 112 (FIG. 3)) between the boot record 316 and the operating system partition 310. At block 608, the example hypervisor installer 208 creates a new virtual file system (e.g., the example virtual file system partition 318 (FIG. 3)) between the end of the operating system partition 310 and the end of the storage device 124.

Figure 7:
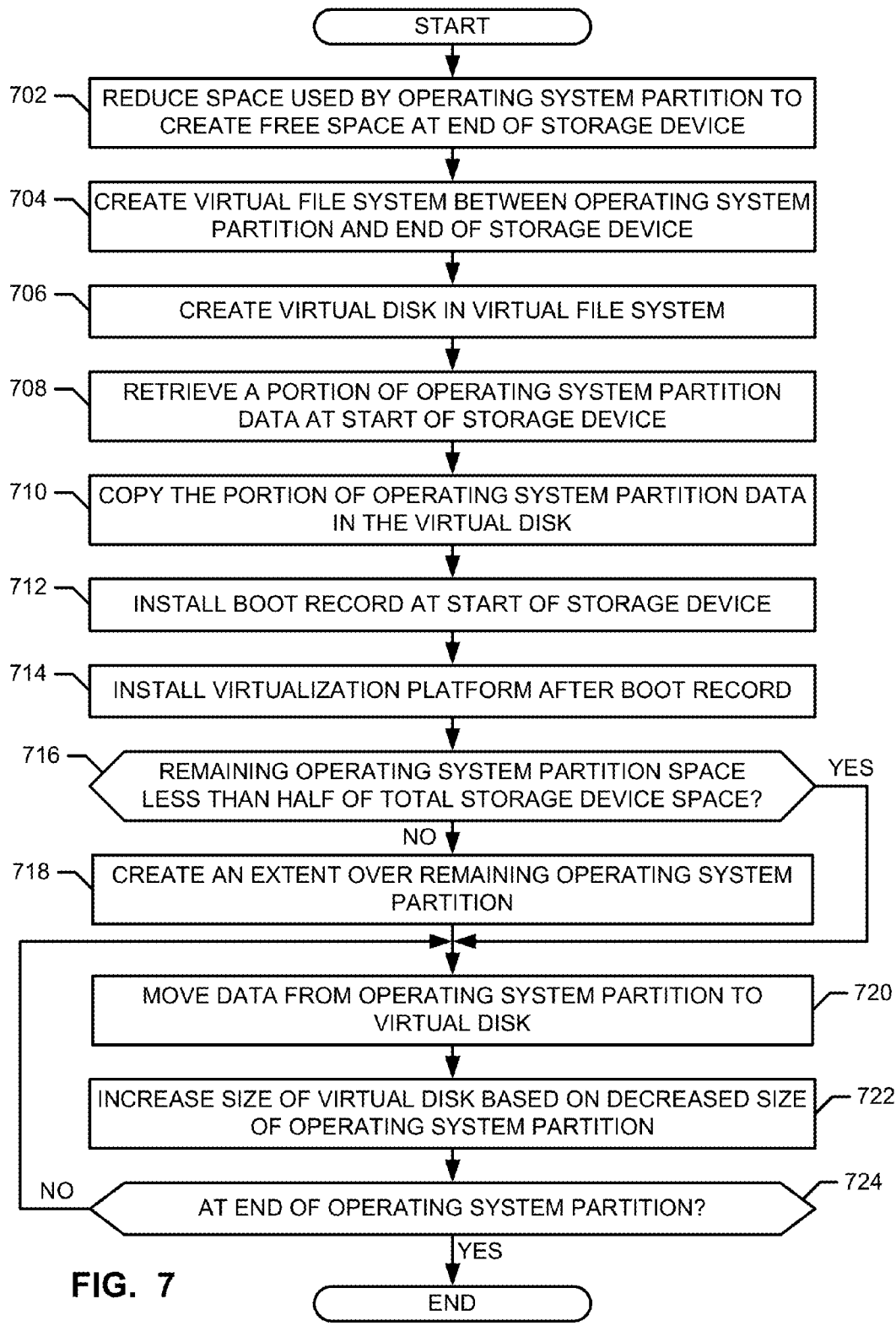

FIG. 7 illustrates another process to adjust an operating system partition and install a hypervisor. The example method of FIG. 7 may be used to implement blocks 510 and 512 of FIG. 5. The example program of FIG. 7 begins at block 702 when the example storage handler 206 (FIG. 2) reduces the space used by the operating system partition 412 (FIG. 4) of the example host machine 106 (FIG. 1) to create free space at the end of the example storage device 124 (FIG. 1) (e.g., the example free space 414 (FIG. 4)). At block 704, the example hypervisor installer 208 creates a new virtual file system partition 416 (FIG. 4) between the end of the operating system partition 412 and the end of the storage device 124. At block 706, the example virtual machine handler 210 creates a virtual disk 418 (FIG. 4) in the virtual file system partition 416.

At block 708, the example storage handler 206 retrieves bits of the operating system partition 412 at the start of the storage disk 124 (e.g., the example block 420 (FIG. 4)). For example, the storage handler 206 may retrieve a number of bits corresponding to the amount of storage space needed to install a boot record and the virtualization platform at the start of the storage device 124. At block 710, the example virtual machine handler 210 inserts the retrieved bits into the virtual disk 418 created in block 708 (e.g., into the example block 422 (FIG. 4)). At block 712, the example hypervisor installer 208 installs the example boot record 424 (FIG. 4) at the start of the storage device 124. At block 714, the example hypervisor installer 208 installs the example virtualization platform 112 (FIG. 4) in the space after the boot record 424 and before the start of the operating system partition 412. For example, the boot record 424 and the virtualization platform 112 may overwrite the data from the operating system partition 412 after the bits have been copied to the virtual disk 418.

In some examples, the method of FIG. 7 may end after block 714. In such examples, the operating system partition 412 will be split between the portion of the partition stored in the virtual disk 418 (e.g., the portion of data 42) and the portion of the partition remaining in the original operating system partition 412. For example, the virtual file system 416 may be configured to span between the partition in the virtual disk and the remaining portion of the original operating system partition 412.

At block 716, the example virtual machine handler 210 determines whether the remaining operating system partition space is less than half of the total storage space of the storage device 124. If the remaining operating system space is less than half of the total storage space of the storage device 124, then control proceeds to block 720 to move data from the operating system partition to the virtual disk. Otherwise, if, at block 716, the virtual machine handler 210 determines that the remaining operating system partition space is not less than half the total storage space of the storage device 124, then, at block 718, the example virtual machine handler 210 installs a second virtual file system (e.g., the example extent 426 (FIG. 4)) over the remaining operating system partition 412.

At block 720, the storage handler 206 and the virtual machine handler 210 cooperate to move a portion of the data from the operating system partition 412 to the virtual disk 418. At block 722, the example virtual machine handler 210 increases the size of the virtual disk 418 by an amount corresponding to the size of the data moved in block 720. Accordingly, the virtual disk 418 grows as the original operating system partition 412 shrinks. At block 722, the storage handler 206 determines if there is data remaining in the operating system partition 412. If there is data remaining, control returns to block 720 to continue shifting data to the virtual disk 418. If, at block 724, the storage handler 206 determines that there is no data remaining in the operating system partition 412, the method of FIG. 7 is completed.

Figure 8:
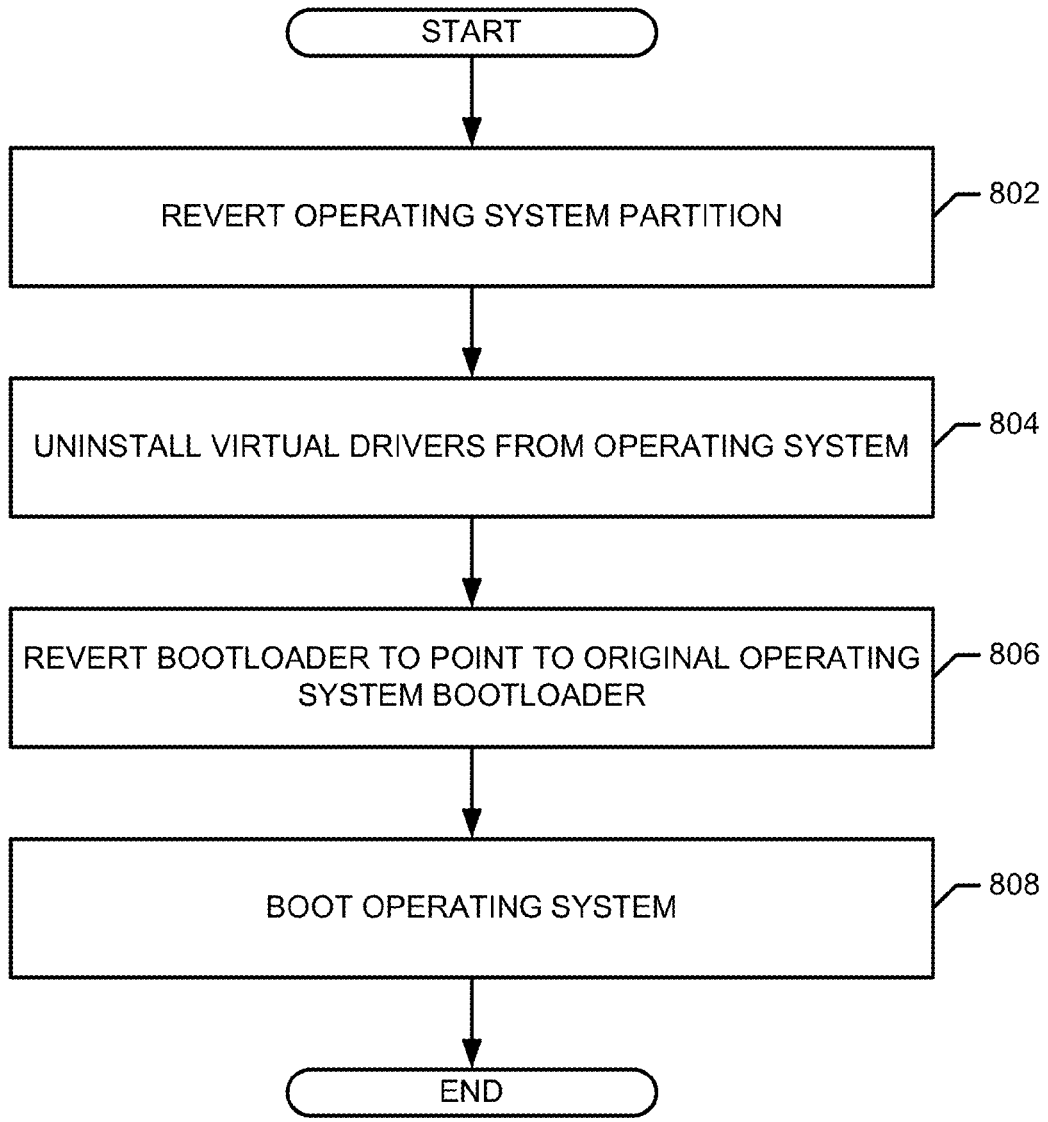
FIG. 8 is a flowchart representative of example machine readable instructions that may be executed to revert a host machine to natively run an operating system after the host machine has been converted to execute a native hypervisor.

The example method of FIG. 8 reverts the host machine 106 to natively run an operating system 111 after the host machine 106 has been converted to execute the native virtualization platform 112 (e.g., by the program illustrated in FIG. 5). The method of FIG. 8 begins at block 802 when the example reversion handler 212 reverts the operating system partition to reverse operations performed in block 510 of FIG. 5. For example, the reversion handler 212 may cause the storage handler 206 to return the partition of the operating system to span substantially the entire storage device. Prior to adjusting the partition, the reversion handler 212 may stop the virtual machine and/or turn off a virtual file system to ensure that data is not written to the partition while the adjustments are performed. At block 804, the example reversion handler 212 causes the virtual machine drivers to be uninstalled from the operating system. At block 806, the example reversion handler 212 reverts the bootloader to point to the bootloader for the operating system (e.g., the example native operating system bootloader 130 (FIG. 1). At block 808, the example reversion handler 212 causes the operating system to be booted. For example, the reversion handler 212 may reboot the host machine 106 to cause the native operating system 111 to be booted. The example method of FIG. 8 then ends.

Figure 9:
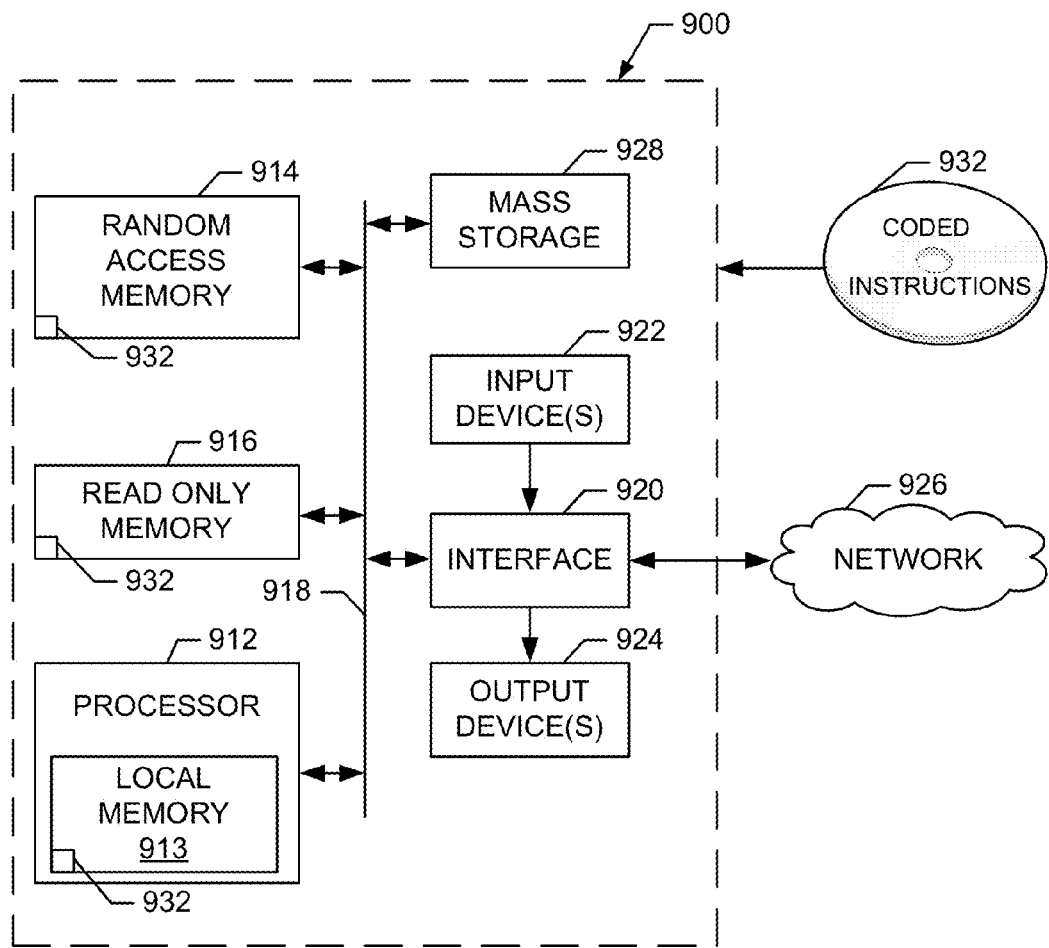
FIG. 9 is a block diagram of an example processing platform capable of executing the example machine readable instructions of FIGS. 5-8 to implement the example machine virtualizer of FIGS. 1 and/or 2.

FIG. 9 is a block diagram of an example processor platform 900 capable of executing the instructions of FIGS. 5-8 to implement the machine virtualizer 128 of FIGS. 1 and/or 2. The processor platform 900 can be, for example, a server or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 5-8 may be stored in the mass storage device 928, in the volatile memory 914, in the non-volatile memory 916, and/or on a removable tangible computer readable storage medium such as a CD or DVD.

From the foregoing, it will be appreciated that above disclosed methods, apparatus and articles of manufacture enable installing of a native hypervisor on a host machine with existing data while substantially maintaining the existing data. For example, existing data may include an original operating system installed on the host machine. Examples disclosed herein enable installing the native hypervisor on the host machine without destroying the original operating system, and without needing manual backup of the original operating system to another (e.g., a second) storage device. Furthermore, examples disclosed herein enable loading a virtual machine to execute the original operating system on the host machine via the native hypervisor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    moving, via a processor, an original operating system to create free space on a storage device;
    installing a hypervisor in the free space on the storage device;
    generating a virtual machine in the free space on the storage device; and
    loading the hypervisor and the virtual machine, the virtual machine to execute the original operating system.

2. A method as defined in claim 1, further comprising installing a boot record in the free space at a location before the hypervisor on the storage device.

3. A method as defined in claim 2, further comprising modifying the boot record to execute a second bootloader to load the hypervisor.

4. A method as defined in claim 3, wherein the modifying of the boot record mincludes chain loading the second bootloader to execute after a bootloader for the original operating system loads.

5. A method as defined in claim 1, further comprising changing the size of the space on the storage device used by original operating system.

6. A method as defined in claim 1, wherein the moving of the original operating system includes:
    reducing the space used by the original operating system to create the free space in the storage device;
    creating a virtual file system in the free space; and
    transferring a portion of the original operating system to the virtual file system.

7. A method as defined in claim 6, further including:
    determining whether the reduced space used by the original operating system is less than half of the total space of the storage device; and
    in response to determining that the reduced space used by the original operating system is greater than or equal to half of the total space of the storage device, creating an extent over the space used by the original operating system.

8. A method as defined in claim 1, wherein the moving of the original operating system further comprises moving a partition on the storage device, the original operating system within the partition.

9. A method as defined in claim 1, wherein the moving of the original operating system on the storage device is performed without deleting the original operating system from the storage device.

10. An apparatus comprising:
    a processor;
    a storage handler to move an original operating system to create free space on a storage device;
    a hypervisor installer to install a hypervisor in the free space on the storage device;
    a virtual machine handler to generate a virtual machine to execute the original operations, and
    the virtual machine handler to load the hypervisor and the virtual machine,
    at least one of the storage handler, the hypervisor installer or the virtual machine handler is implemented by the processor.

11. An apparatus as defined in claim 10, further comprising a boot handler to install a boot record in the free space at a location before the hypervisor on the storage device.

12. An apparatus as defined in claim 11, wherein the boot handler is to chain load a second bootloader to execute after a bootloader for the original operating system loads.

13. An apparatus as defined in claim 10, wherein the storage handler is to change the size of the space on the storage device used by the original operating system.

14. An apparatus as defined in claim 10, wherein the virtual machine handler is to:
    create a virtual file system in the free space; and transfer a portion of the original operating system to the virtual file system.

15. An apparatus as defined in claim 14, wherein the virtual machine handler is to:
   determine whether the space used by the original operating system is less than half of the total space of the storage device; and
   in response to determining that the space used by the original operating system is greater than or equal to half of the total space of the storage device, create an extent over the space used by the original operating system.

16. An apparatus as defined in claim 10, wherein the storage handler is to move a partition on the storage device to create the free space, the original operating system within the partition.

17. An apparatus as defined in claim 10, wherein the storage handler is to move the original operating system on the storage device without deleting the original operating system from the storage device.

18. A tangible computer readable storage medium comprising instructions that, when executed, cause a processor to at least:
   move an original operating system on a storage device to create free space on the storage device;
   install a hypervisor in the free space on the storage device;
   generate a virtual machine in the free space on the storage device; and
   load the hypervisor and the virtual machine, the virtual machine to execute the original operating system.

19. A tangible computer readable storage medium as defined in claim 18, wherein the instructions further cause the processor to install a boot record in the free space at a location before the hypervisor on the storage device.

20. A tangible computer readable storage medium as defined in claim 19, wherein the instructions further cause the processor to modify the boot record to execute a second bootloader to load the hypervisor.

21. A tangible computer readable storage medium as defined in claim 20, wherein the instructions further cause the processor to chain load the second bootloader to execute after a bootloader for the original operating system loads.

22. A tangible computer readable storage medium as defined in claim 18, wherein the instructions further cause the processor to change the size of the space on the storage device used by the original operating system.

23. A tangible computer readable storage medium as defined in claim 18, wherein the instructions further cause the processor to:
   reduce the space used by the original operating system to create the free space in the storage device;
   create a virtual file system in the free space; and
   transfer data from a portion of the original operating system to the virtual file system.

24. A tangible computer readable storage medium as defined in claim 23, wherein the instructions further cause the processor to:
   determine whether the reduced space used by the original operating system is less than half of the total space of the storage device; and
   in response to determining that the reduced space used by the original operating system is greater than or equal to half of the total space of the storage device, create an extent over the space used by the original operating system.

25. A tangible computer readable storage medium as defined in claim 18, wherein the instructions further cause the processor to move a partition on the storage device, the original operating system within the partition.

26. A tangible computer readable storage medium as defined in claim 18, wherein the instructions further cause the processor to move the original operating system on the storage device without deleting the original operating system from the storage device.

27. A method comprising:
   moving, via a processor, an original operating system from a first location on a storage device to a second location on the storage device to create free space on the storage device;
   installing a boot record in the free space on the storage device;
   installing a hypervisor on the storage device;
   adjusting the boot record to boot the hypervisor; and
   generating a virtual machine to execute the original operating system.

28. A method as defined in claim 27, wherein the free space is a first free space, and the moving of the original operating system from the first location on the storage device to a second location on the storage device further includes creating a second free space on the storage device.

29. A method as defined in claim 28, wherein the installing of the hypervisor on the storage device further comprises installing the hypervisor in the second free space.

30. A method as defined in claim 27, wherein the first free space is adjacent to a first end of the original operating system and the second free space is adjacent to a second end of the original operating system.

31. A method as defined in claim 27, further comprising modifying the boot record to execute a second bootloader to load the hypervisor.

32. A method as defined in claim 31, wherein the modifying of the boot record includes chain loading the second bootloader to execute after a bootloader for the original operating system loads.

33. A method as defined in claim 27, wherein the moving of the original operating system includes:
   creating a virtual file system at the second location on the storage device; and
   transferring a portion of the original operating system from the first location on the storage device to the virtual file system at the second location on the storage device.

34. A method as defined in claim 27, wherein the moving of the original operating system from the first location on the storage device to the second location on the storage device further comprises moving a partition at the first location on the storage device to the second location on the storage device, the original operating system within the partition.

35. A method as defined in claim 27, wherein the moving of the original operating system from the first location on the storage device to the second location on the storage device is performed without deleting the original operating system from the first location on the storage device.

36. A method as defined in claim 27, further comprising loading the hypervisor and the virtual machine.

37. An apparatus comprising:
   a processor;
   a storage handler to move an original operating system from a first location on a storage device to a second location on the storage device to create free space on the storage device;
   a hypervisor installer to install a hypervisor on the storage device;

a boot handler to install a boot record in the free space on the storage device, and the boot handler to adjust the boot record to boot the hypervisor; and a virtual machine handler to generate a virtual machine to execute the original operating system, at least one of the storage handler, the hypervisor installer, the boot handler or the virtual machine handler is implemented by the processor.

38. A tangible computer readable storage medium comprising instructions that, when executed, cause a processor to at least:

move an original operating system from a first location on a storage device to a second location on the storage device to create free space on the storage device;

install a hypervisor on the storage device;

install a boot record in the free space on the storage device;

adjust the boot record to boot the hypervisor; and generate a virtual machine to execute the original operating system.

* * * * *